Figure 1:
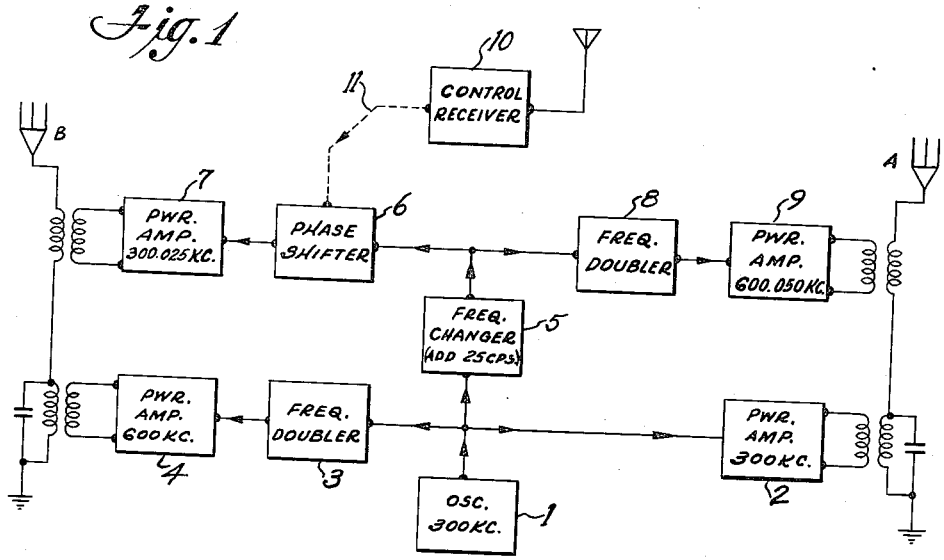

April 24, 1951

W. J. O'BRIEN 2,550,372

RADIO BEACON SYSTEM

Filed Feb. 10, 1949

INVENTOR.
WILLIAM J. O'BRIEN
BY
Walter P. Huntley
Attorney

Patented Apr. 24, 1951

2,550,372

UNITED STATES PATENT OFFICE 2,550,372

RADIO BEACON SYSTEM

William J. O'Brien, London, England, assignor to The Decca Record Company, Limited, London, England, a corporation of Great Britain Application February 10, 1949, Serial No. 75,682

5 Claims. (Cl. 343—105)

My invention relates to a radio beacon system of the equi-phase displacement type and has particular reference to a novel radio beacon transmitting and receiving apparatus which reduces to a minimum the course indication errors resulting from phase shifts within the receiving apparatus.

This application is a division of my copending application Serial No. 612,996, filed August 27, 1945 and entitled "Radio Beacon System" now Patent No. 2,483,557 granted October 4, 1949.

In my copending application Serial No. 701,745, filed October 7, 1946, and entitled "Radio Beacon System" (a continuation-in-part of my application Serial No. 420,059, filed November 22, 1941), now abandoned, I have disclosed and claimed a radio beacon navigational system of the equi-phase displacement type in which two spaced transmitters are operated at different but harmonically related frequencies and at a fixed multiple phase relation with respect to each other. These signals are received by a mobile receiver mounted within the vehicle employing the navigational aids afforded by the system. Within the receiver the received signals are brought to a common comparison frequency and the phase relation between the resulting potentials are measured and indicated continuously to apprise the operator of the vehicle of his direction of travel with respect to a predetermined compass course.

In the apparatus just briefly described considerable care must be exercised in the design, adjustment and operation of the receiving equipment to prevent additional phase shifts within the two receiving channels from providing an erroneous indication as to the location of the vehicle with respect to its noted course. For this reason there is included in the apparatus disclosed in the aforementioned application a phase displacement standard or reference signal which may at any time be switched into the receiver input to provide a ready check upon the operation of the receiver.

The present invention is directed to overcoming these phase shift difficulties by providing a receiving apparatus in which the reference signals are used continuously as a standard against which the phase of the received signals are compared for indicating the location of the vehicle relative to the desired course, and in which the reference signals are applied to the same two transmitters as are employed for establishing the equi-phase displacement pattern utilized by the system.

It is accordingly an object of my invention to provide a radio beacon system of the equi-phase displacement type which overcomes the above noted disadvantages by making the required phase comparison on the basis of a low frequency in or near the audible range.

It is also an object of my invention to provide a novel receiving apparatus for use with a radio beacon transmitting apparatus of the character disclosed in my aforementioned copending application and which employs a signal generator producing a fixed phase displacement standard as a reference against which all phase displacement comparisons are made.

It is additionally an object of my invention to provide a radio beacon system of the character set forth in the preceding paragraphs in which the reference signals employed as a standard of phase comparison are transmitted to the mobile receiver by means of the same transmitting apparatus as is employed to establish the equi-phase displacement field pattern.

Figure 2:
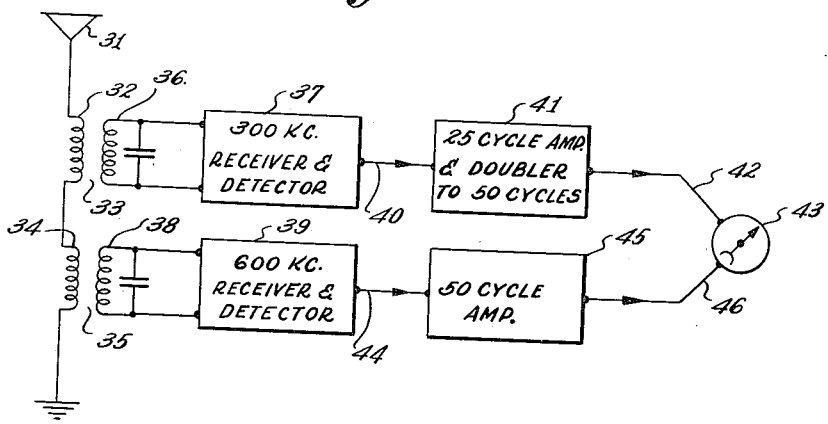

Other objects and advantages of my invention will be apparent from a study of the following specifications read in connection with the accompanying drawings, wherein:

Fig. 1 is a block diagram representing the transmitting apparatus which may be used for an equi-phase displacement type of radio beacon system; and Fig. 2 is a block diagram disclosing the apparatus employed in a novel receiving apparatus for use with radio beacon system of the equi-phase displacement type.

As before stated, the radio beacon system which is disclosed in my aforementioned copending application employs two radio frequency transmitters operating on different but harmonically related frequencies and with a fixed multiple phase relation between the transmitted signals to establish an equi-phase displacement field pattern.

In the drawings I have disclosed a system in which a reference signal for phase comparison is transmitted from the same two antennae as are used to establish the equi-phase displacement field pattern. Two transmitters A and B are spaced apart a predetermined distance and energized at different but harmonically related frequencies in accordance with the disclosure in my aforementioned copending application, Serial No. 701,745.

For the purpose of illustration, it will be assumed that the transmitters A and B are spaced apart three wave lengths as measured at a frequency of 300 kilocycles and that the transmitters are energized, respectively, at 300 and 600 kilocycles. Also, the transmitting equipment is arranged to supply to antenna A a 600.050 kilocycle signal and to supply to antenna B a 300.025 kilocycle signal.

The transmitting apparatus may take the form represented by the block diagram of Fig. 1. A 300 kilocycle oscillator 1 is employed which feeds antenna A through a 300 kilocycle power amplifier 2 and which also feeds antenna B through a frequency doubler 3 and a 600 kilocycle power amplifier 4. The 300 kilocycle output from the oscillator 1 is also applied to the input of a frequency changer 5 operating to add 25 cycles per second to the input frequency so as to produce an output frequency of 300.025 kilocycles.

The frequency changer 5 may be of any suitable type but conveniently takes the form of a goniometer, the stationary coils of which are supplied with 300 kilocycle energy in such a way as to establish a 300 kilocycle rotating field. The rotating coil is rotated in a direction counter to the direction of rotation of the rotating field and at the 25 cycle speed so as to induce in the rotating winding a 300.025 kilocycle signal. This signal is applied to antenna B through a phase shifter 6 and through a 300.025 kilocycle amplifier 7.

The 300.025 kilocycle output from the frequency changer 5 is also passed through a frequency doubler 8 and through a 600.050 kilocycle power amplifier 9 coupled to antenna A. For phase control, I employ a control receiver 10 which may be of the character described hereinafter with reference to Fig. 2 and which is connected by means of a control connection represented by the dotted line 11 in Fig. 1 to the phase shifter 6. The control receiver 10 and phase shifter 6 operate to shift the phase of the 300.025 kilocycle signals in such direction and by such amount as is required to restore the navigation pattern to its desired orientation.

The equi-phase field pattern produced is of the usual hyperbolic character. However, by reason of the transmission of dual frequencies from each of the two antennae, twice the normal indication sensitivity is obtained. This is because a deviation of the guided vehicle from a given course will cause a change in one direction in the multiple phase relation between the 600 and 300 kilocycle signal and will, at the same time, cause a change in the opposite direction in the multiple phase relation between the 300.025 and 600.050 kilocycle signals.

In Fig. 2 I have illustrated receiving apparatus suitable for use with a transmission arrangement of the character just described. This apparatus includes a receiving antenna 31 coupled in a series circuit including a primary winding 32 of a coupling transformer 33 and a primary winding 34 of a coupling transformer 35. The coupling transformer 33 includes a secondary winding 36 tuned to 300 kilocycles and connected to the input of a 300 kilocycle radio frequency receiver 37. Similarly, the coupling transformer 35 includes a secondary winding 38 which is tuned to 600 kilocycles and connected to the input of a 600 kilocycle radio frequency receiver 39.

Each of the receivers 37 and 39 include rectifying or detecting circuits operating to develop across the receiver output terminals alternating potentials having the same frequency as the heterodyne between the two frequencies applied to the input circuits of the receivers. Thus receiver 37 develops across its output terminals a 25 cycle signal resulting from the heterodyne of the 300 kilocycle signal radiated from antenna A with the 300.025 kilocycle signal radiated from antenna B. In like manner, there appears across the output terminals of the receiver 39 a 50 cycle signal resulting from heterodyning the 600 kilocycle signal radiated from antenna B with the 600.050 kilocycle signal radiated from antenna A.

Receiver 37 is coupled as indicated at 40 to a 25 cycle amplifier and frequency doubler 41 operating to produce an output potential having a frequency of 50 cycles. This output is applied as indicated at 42 to one input circuit of continuous phase indicator 43. The output of receiver 39 is coupled as indicated at 44 to the input of a 50 cycle amplifier 45, the output of which is connected as indicated at 46 to the other input circuit of the phase indicator 43.

The phase indicator 43 may comprise an instrument of any type suitable for indicating the phase angle between two 50 cycle potentials. A preference is expressed for the indicating apparatus which is disclosed in my copending application Serial No. 612,991, filed August 27, 1945 and entitled "Multiple Channel Radio Frequency Receiver", now Patent No. 2,500,200, granted March 14, 1950.

The multiple phase relations between the 600.050 and 300.025 kilocycle signals applied to the input circuits of the receivers 37 and 39 are a function only of the geographical location of the mobile receiver with respect to the transmitting antenna, these signals having been transmitted at a fixed multiple phase relation. Thus, the multiple phase relation between the two heterodyne frequencies (25 cycles and 50 cycles, respectively) is dependent solely upon the geographical location of the vehicle with respect to the transmitting apparatus.

The amplifiers and doubler 41 and 45 operate to bring the heterodyne frequencies to equality for comparison purposes at a frequency of 50 cycles per second. The phase relation between these signals which is indicated by the phase indicator 43 is therefore truly representative of the geographical location of the vehicle relative to the transmitting apparatus. Furthermore, since the phase relationship between the heterodyne frequencies are established in the antenna circuit, phase shifts in the high frequency signals passed by the receivers 41 and 45 do not seriously affect the accuracy of the indication given by the phase indicator 43.

Attention is directed particularly to the fact that with the apparatus herein described the equi-phase field pattern is developed by radio frequency radiations of relatively high frequencies providing great sensitivity as regards course indication without requiring the transmitting antennae to be separated by great distances. At the same time the phase comparison is made on the basis of a very low frequency having a wave length of the order of magnitude of three or four thousand miles, so that phase shifts introduced by the receiving apparatus into the high frequency signals introduces substantially no error in the indication given by the phase comparison between the low frequency signals. It will be noted that the fixed phase standard used as a basis for making the phase comparison comprises reference signals which are transmitted to the mobile receiver by means of the same antennae as are used to establish the equi-phase displacement field pattern.

While I have shown and described the preferred embodiment of my invention, I do not desire to be limited to the details of construction shown and described herein, except as defined in the appended claims.

I claim:

1. In a radio beacon transmitting apparatus, the combination of: a pair of transmitting antennae spaced from each other; means for radiating from one of said antennae radio frequency signals of one frequency; means for radiating from the other of said antennae radio frequency signals of a second frequency harmonically related to said one frequency and having a fixed multiple phase relation therewith; means for also radiating from said other one of said antennae radio frequency signals of a third frequency differing slightly from said one frequency; and means for also radiating from said one of said antenna radio frequency signals of a fourth frequency differing slightly from said second frequency and bearing a harmonic relation to said third frequency and having a fixed multiple phase relation therewith.

2. In a radio beacon system, the combination of: a pair of transmitting antennae spaced from each other; means for radiating from one of said antennae radio frequency signals of one frequency; means for radiating from the other of said antennae radio frequency signals of a second frequency harmonically related to said one frequency and having a fixed multiple phase relation therewith; means for also radiating from said other one of said antennae radio frequency signals of a third frequency differing slightly from said one frequency; means for also radiating from said one of said antennae radio frequency signals of a fourth frequency differing slightly from said second frequency and bearing a harmonic relation to said third frequency and having a fixed multiple phase relation therewith; mobile receiver means for receiving said one and said third frequencies separately from said second and said fourth frequencies to thereby produce two potentials of harmonically related frequencies equal respectively to the difference between said one and third frequencies and said second and fourth frequencies; and means for measuring and continuously indicating the multiple phase relation between said two potentials.

3. In a radio beacon transmitting apparatus, the combination of: a pair of transmitting antennae spaced from each other; means for radiating from one of said antennae a first signal comprising a given harmonic of a given fundamental frequency and a second signal comprising another harmonic of a different fundamental frequency differing but slightly from said given fundamental frequency; means for radiating from the other of said antennae a third signal comprising said other harmonic of said given fundamental frequency and a fourth signal comprising said given harmonic of said different fundamental frequency; and means for maintaining a fixed multiple phase relation between said first and third signals.

4. The method of determining at a given location the multiple phase relation between two continuous radio frequency navigation signals radiated from spaced points at different but harmonically related frequencies bearing a fixed multiple phase relation to each other, which consists in additionally radiating with each of said navigation signals a different one of a pair of reference signals differing by less than one percent in frequency from the corresponding navigation signal but bearing the same harmonic relation to each other as said navigation signals and having a fixed multiple phase relation to each other, receiving at said location said navigation signals and said reference signals, and then measuring the multiple phase relation between the two low frequencies resulting from heterodyning each of said reference signals with the corresponding navigation signal.

5. The method of guiding the navigation of a mobile vehicle which consists in radiating from spaced points radio frequency navigation signals of two different frequencies bearing a given harmonic relation to each other and having a fixed multiple phase relation, additionally radiating with said navigation signals reference signals having said given harmonic relation and a fixed multiple phase relation but each differing by less than one percent in frequency from the frequency of the corresponding navigation signal, receiving at said vehicle said navigation signals and said reference signals, and determining the multiple phase relation at the location of said vehicle between the heterodyne frequencies of each of said reference signals with the corresponding navigation signal.

WILLIAM J. O'BRIEN.

REFERENCES CITED

The following references are of record in the file of this patent:

UNITED STATES PATENTS

| Number | Name | Date |
| --- | --- | --- |
| 2,483,557 | O'Brien | Oct. 4, 1949 |